(12) United States Patent
Buelna et al.

(10) Patent No.: US 8,152,688 B2
(45) Date of Patent: Apr. 10, 2012

(54) COMPENSATOR FOR CONTINUOUSLY VARIABLE TRANSMISSION

(75) Inventors: Terry Buelna, Foothill Ranch, CA (US); Neil Gupta, Costa Mesa, CA (US)

(73) Assignee: Terry Buelna

( * ) Notice: Subject to any disclaimer, the term of this patent is extended or adjusted under 35 U.S.C. 154(b) by 428 days.

(21) Appl. No.: 12/466,304

(22) Filed: May 14, 2009

(65) Prior Publication Data
US 2009/0286647 A1 Nov. 19, 2009

Related U.S. Application Data

(60) Provisional application No. 61/127,967, filed on May 16, 2008.

(51) Int. Cl.
*F16H 15/16* (2006.01)
(52) U.S. Cl. .............. 476/51; 476/65; 476/71
(58) Field of Classification Search ............ 476/31, 476/33, 51, 65, 66, 71
See application file for complete search history.

(56) References Cited

U.S. PATENT DOCUMENTS

| | | |
|---|---|---|
| 625,859 A | 5/1899 | Thornton et al. |
| 923,472 A | 6/1909 | Williamson |
| 1,232,243 A | 7/1917 | Dick |
| 1,883,749 A | 10/1932 | Standish |
| 2,292,066 A | 8/1942 | Erban |
| 2,573,258 A | 10/1951 | Gerritsen |
| 2,936,638 A * | 5/1960 | Wassilieff ............... 475/192 |
| 3,006,206 A | 10/1961 | Kelley et al. |
| 4,137,785 A | 2/1979 | Virlon |
| 5,014,565 A | 5/1991 | Stephenson |
| 5,254,056 A | 10/1993 | Nakano |
| 6,053,841 A | 4/2000 | Koide et al. |
| 6,106,431 A | 8/2000 | Oshidari |
| 6,676,560 B1 * | 1/2004 | Buelna ..................... 476/51 |

FOREIGN PATENT DOCUMENTS

DE 2313097 A1 9/1974

OTHER PUBLICATIONS

K. Clemens, "Technology of the Year 1996—Honda's Continuously Variable Transmission", Automobile Magazine, Jan. 1996.
T. Swan, "Smooth-Shifting Honda Civic Coupe Stays One of the Best Small Cars", Aug. 22, 1996, http://www.auto.com/reviews/86421.htm.
M. Kluger, "Gearing up for CVTs", Technology Today, Summer 2000, published by Southwest Research Institute.
"Distribution of the Toroidal CVT", JATCO TransTechnology Ltd., http://www.jatco.co.jp/E_JATCO/NEWS02.HTM.

* cited by examiner

*Primary Examiner* — William C Joyce
(74) *Attorney, Agent, or Firm* — Stetina Brunda Garred & Brucker

(57) ABSTRACT

A continuously variable transmission may have a first set of rollers and a second set of rollers that act upon skewed driving and driven surfaces of discs. The input to output ratio of the continuously variable transmission may be changed by pushing either one of the first and second sets of rollers closer to a rotating shaft. To maintain symmetrical loading within the continuously variable transmission, an idler disc assembly may have a strain compensator that deflects to compensate for deflection of outer discs due to elasticity of the main shaft.

13 Claims, 6 Drawing Sheets

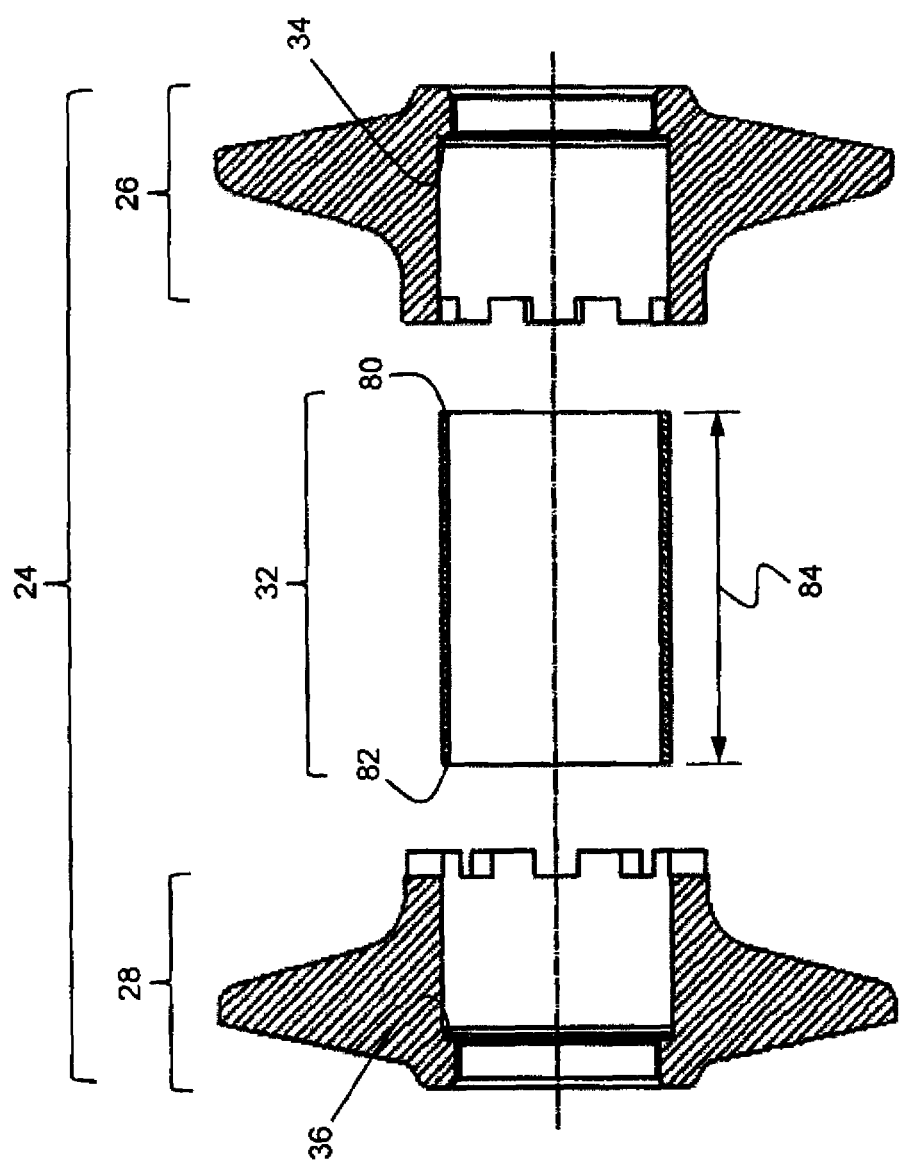

COMPENSATOR FOR CONTINUOUSLY VARIABLE TRANSMISSION

CROSS-REFERENCE TO RELATED APPLICATIONS

This application claims priority to U.S. Provisional Patent Application No. 61/127,967 filed May 16, 2008, the entire contents of which is expressly incorporated herein by reference.

STATEMENT RE: FEDERALLY SPONSORED RESEARCH/DEVELOPMENT

Not Applicable

BACKGROUND

The present invention relates to a continuously variable transmission (CVT).

An example of a continuously variable transmission is shown in U.S. Pat. No. 6,676,560 ('560 patent), issued to Terry Buelna on Jan. 13, 2004. The continuously variable transmission has many potential applications such as an automotive transmission, an industrial drive or a wind turbine drive train. One of the benefits of the continuously variable transmission is that the drive ratio from input to output is infinitely variable throughout its range. The drive ratio is limited only by the relative sizes of the drive components.

As discussed in the '560 patent, the drive ratio from input to output is varied by pushing a first set of rollers closer to a main shaft. This has the effect of traversing a second set of rollers further away from the main shaft. The relative positions of the first and second sets of rollers determine the drive ratio. Since the first and second sets of rollers are frictionally engaged to a plurality of discs, the first and second sets of rollers may be positioned at any distance from the main shaft. Hence, the drive ratio may be fine tuned based on the requirements of the overall device in which the continuously variable transmission is used.

During operation of the continuously variable transmission, the drive ratio from input to output is varied. When either the first or second sets of rollers is pushed toward the main shaft, the forces imposed on the rollers and discs may be imbalanced thereby causing various issues (e.g., efficiencies, misalignment, etc.) in the continuously variable transmission. As such, there is a need in the art for an improved continuously variable transmission.

BRIEF SUMMARY

The continuously variable transmission discussed herein addresses the problems discussed above, known in the art and discussed below. The continuously variable transmission maintains alignment of the various components through the use of a strain compensator to deflect a split idler disc assembly a corresponding amount compared to deflection of outer discs.

Power may be transferred to an input gear through an input flange. The input gear may be supported within a housing of the continuously variable transmission by anti friction bearings. The input gear distributes the power equally to conical drive rollers through roller gears. Axes of the conical drive rollers are preferably equally spaced in a plane perpendicular to a rotating axis. There is no maximum limit to the number of conical rollers but the minimum number is preferably two. The conical drive rollers may have a spline shaft that transmits torque from roller gears to the conical rollers while still allowing the conical rollers to translate freely along its axes.

In order for the drive roller to transmit power to an outer disc and an idler disc assembly, the drive roller should be forced tightly against the outer disc and a first disc of the idler disc assembly. The force on the drive rollers may be produced by a hydraulic pressure chamber behind each conical drive roller. Hydraulic pressure may be introduced into the hydraulic chamber through a pressure tight rotary joint at each chamber. The hydraulic chambers of the drive rollers may be hydraulically linked together so that an equal traction force is applied to each roller/disc interface as the hydraulic pressure is adjusted. The opposing force produced by the hydraulic chambers may be contained within the roller gear body which may be supported by anti friction bearings.

Power may be taken out of the continuously variable transmission by a set of driven conical rollers rotatably connected to an output gear. The output gear may be supported by anti friction bearings. Power may be taken out of the output gear through an output drive flange.

The shaft assembly may include a pair of outer discs connected to a shaft by a spline. The shaft assembly may freely rotate and translate about its axis. The outer discs of may be maintained at a fixed distance relative to each other by threaded nuts. First and second idler discs of a split idler disc assembly may be rotatably connected to the shaft and free to move axially but rotatably fixed to each other by a toothed clutch. The first and second idler discs may freely rotate and laterally translate about the shaft. The idler discs may be spaced apart by a strain compensation device. The strain compensation device may function as a compression spring element that has an axial stiffness rate matched to the axial stiffness rate of the shaft. Preferably, the axial stiffness of the strain compensation device is equal to or about equal to the axial stiffness rate of the shaft.

The axial position of the conical rollers relative to the discs may be achieved by altering the volume of the hydraulic fluid in each hydraulic chamber. The cone angle of the drive rollers may be identical to or close to the cone angle of the driven rollers. The outer discs may be maintained at a fixed distance to each other. So an axial movement of the drive rollers must be matched by an inverse axial movement of the driven rollers. It is this relative axial roller movement that effects a ratio change in the continuously variable transmission. Each conical roller may have a spring that provides a supplemental traction force in addition to the hydraulic chamber pressure.

In order for one set of conical rollers to move inward, the discs contacting the conical rollers must move apart. This occurs because the outer discs and the idler discs may freely rotate and translate relative to each other. As the discs in one half are forced apart in response to the inward movement of the conical rollers, the discs in the other half are moved closer together. As the discs in the other half move closer together, their mating conical rollers are in turn forced outward along their axes. The minimum cone angle of the rollers and discs is selected such that the resultant axial roller loading force is always greater than the axial component of the friction force caused by the coefficient of friction at the contact location. This will allow the conical rollers to be able to be forced outward along their axes purely by the inward movement of the disc pairs.

In order to maintain accurate contact geometry of the conical rollers and discs, asymmetric loads (e.g., radial loads) on these components are mitigated. The axes of rotation of the input rollers and output rollers should be maintained coplanar and at a constant offset. The outer discs experience a force pushing them apart due the conical roller traction pressures acting on the disc cone angle. The outer discs are connected together by the shaft. Even though the shaft is constructed of steel, it still has a finite axial spring rate, which is function of its material properties and structural configuration. The finite axial spring rate of the shaft permits the outer discs to move apart a small amount due to the loading forces imparted by the conical rollers. The displacement of the outer discs relative to each other moves the conical roller axes of rotation out of plane, and imparts an asymmetric radial force on the conical roller. To prevent this from occurring, the idler disc pair must deflect. Preferably, the idler disc pair deflects an identical amount as the outer discs. This is accomplished by placing a strain compensator between the idler discs.

BRIEF DESCRIPTION OF THE DRAWINGS

These and other features and advantages of the various embodiments disclosed herein will be better understood with respect to the following description and drawings, in which like numbers refer to like parts throughout, and in which:

FIG. 6 is a cross sectional view of FIG. 5.

DETAILED DESCRIPTION

Figure 1:
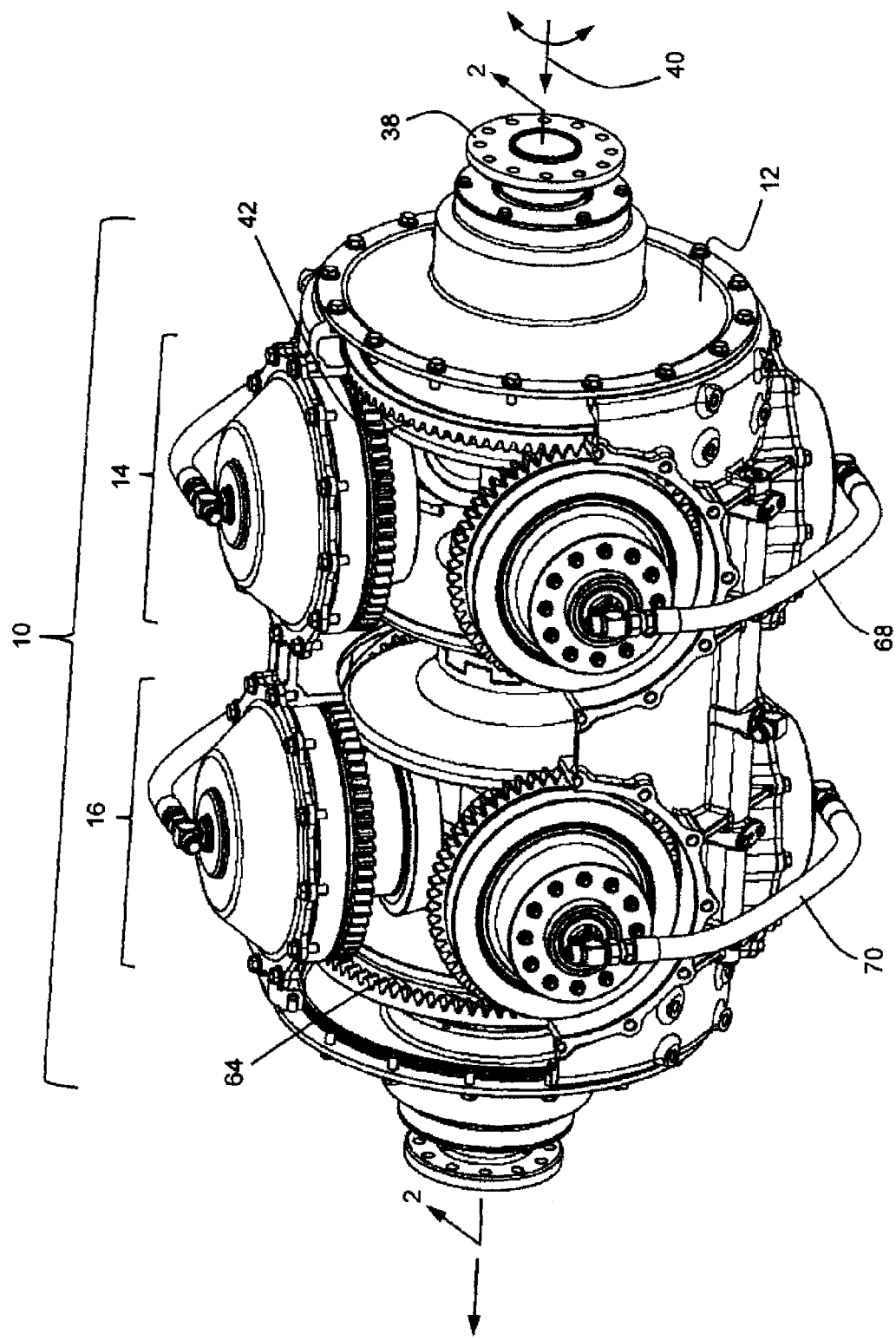
FIG. 1 is a perspective view of a continuously variable transmission.
Figure 2:
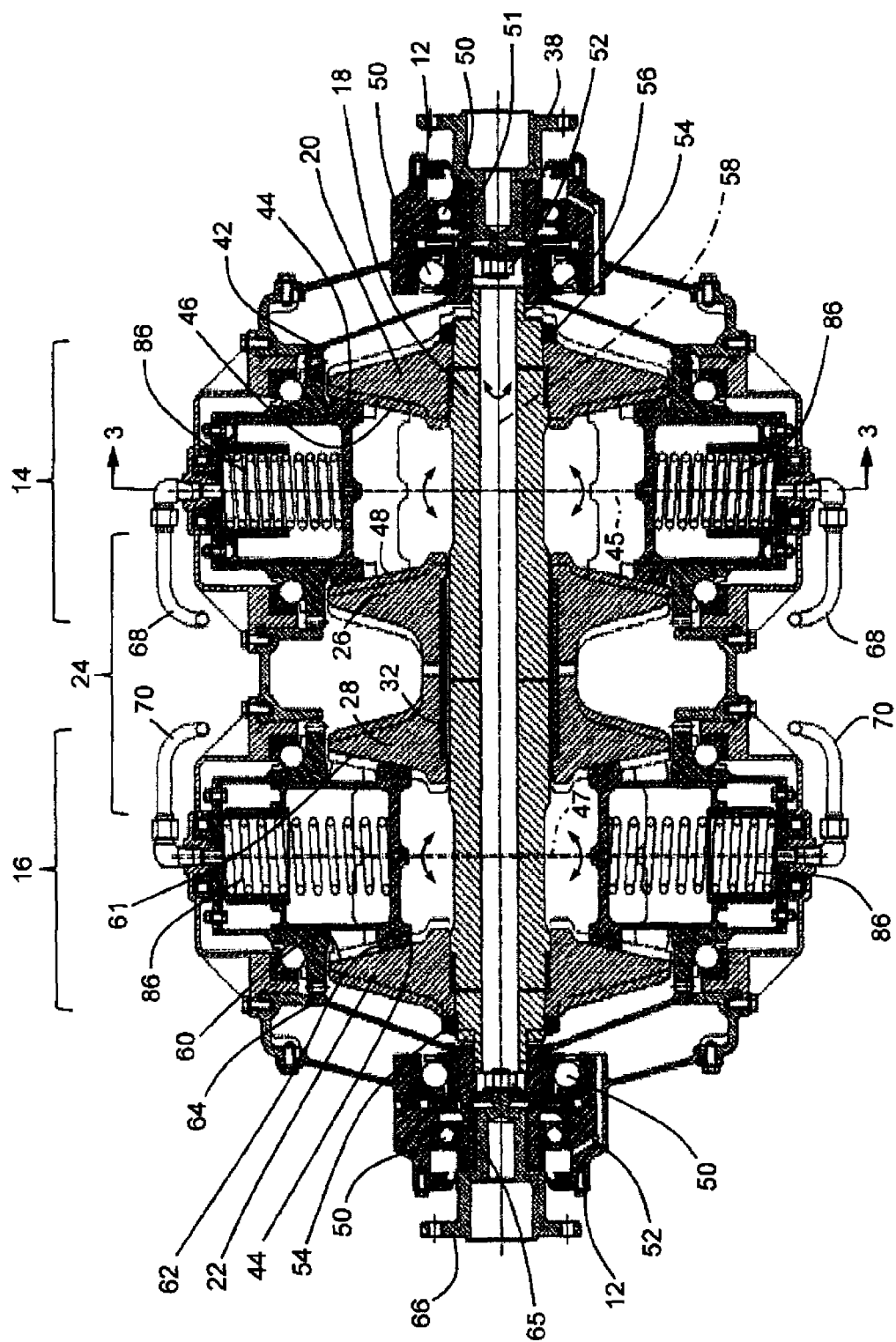
FIG. 2 is a cross sectional view of the continuously variable transmission shown in FIG. 1.
Figure 4:
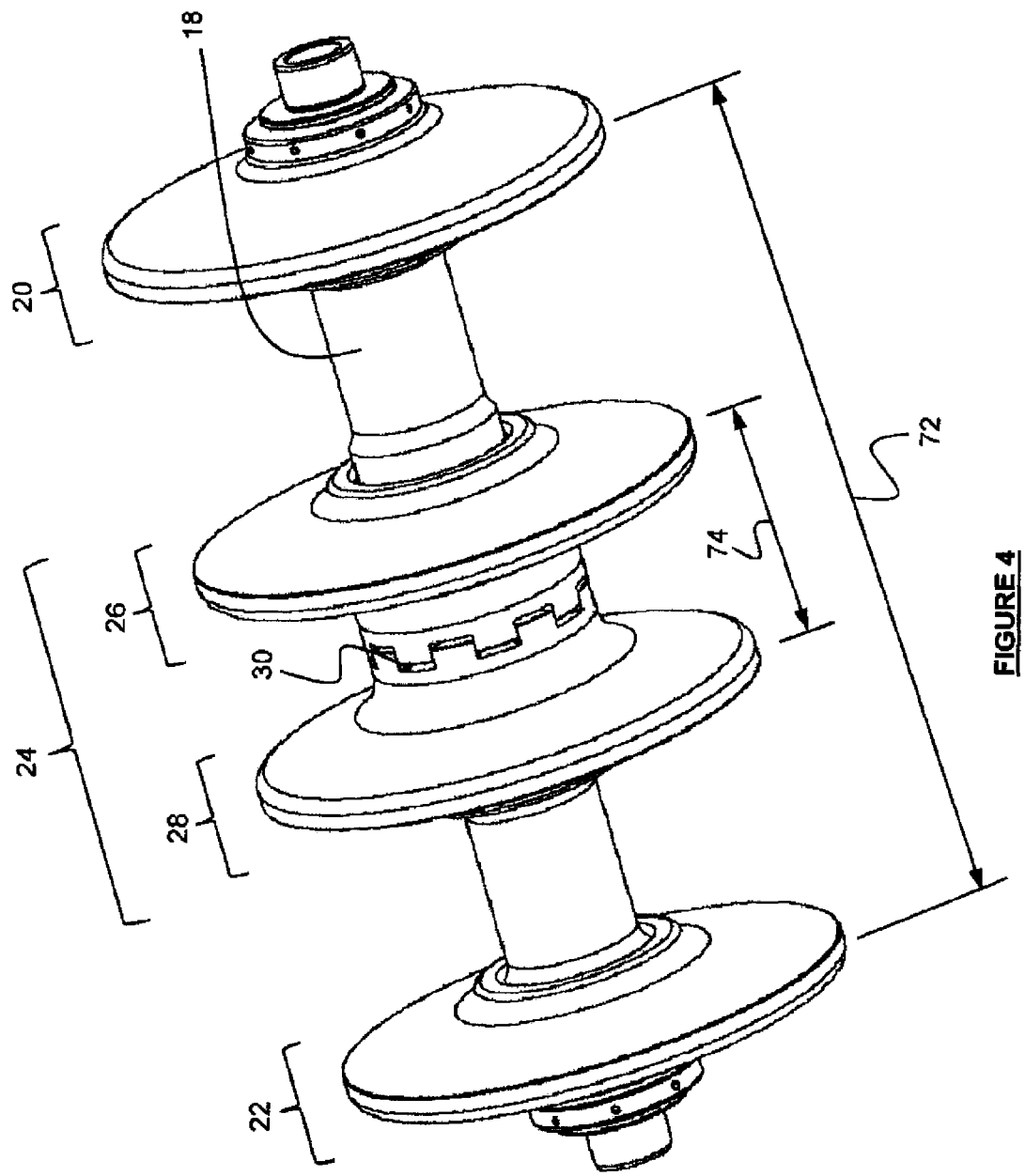
FIG. 4 is a perspective view of a toothed split idler disc assembly, driving disc, and driven disc mounted to a shaft.
Figure 5:
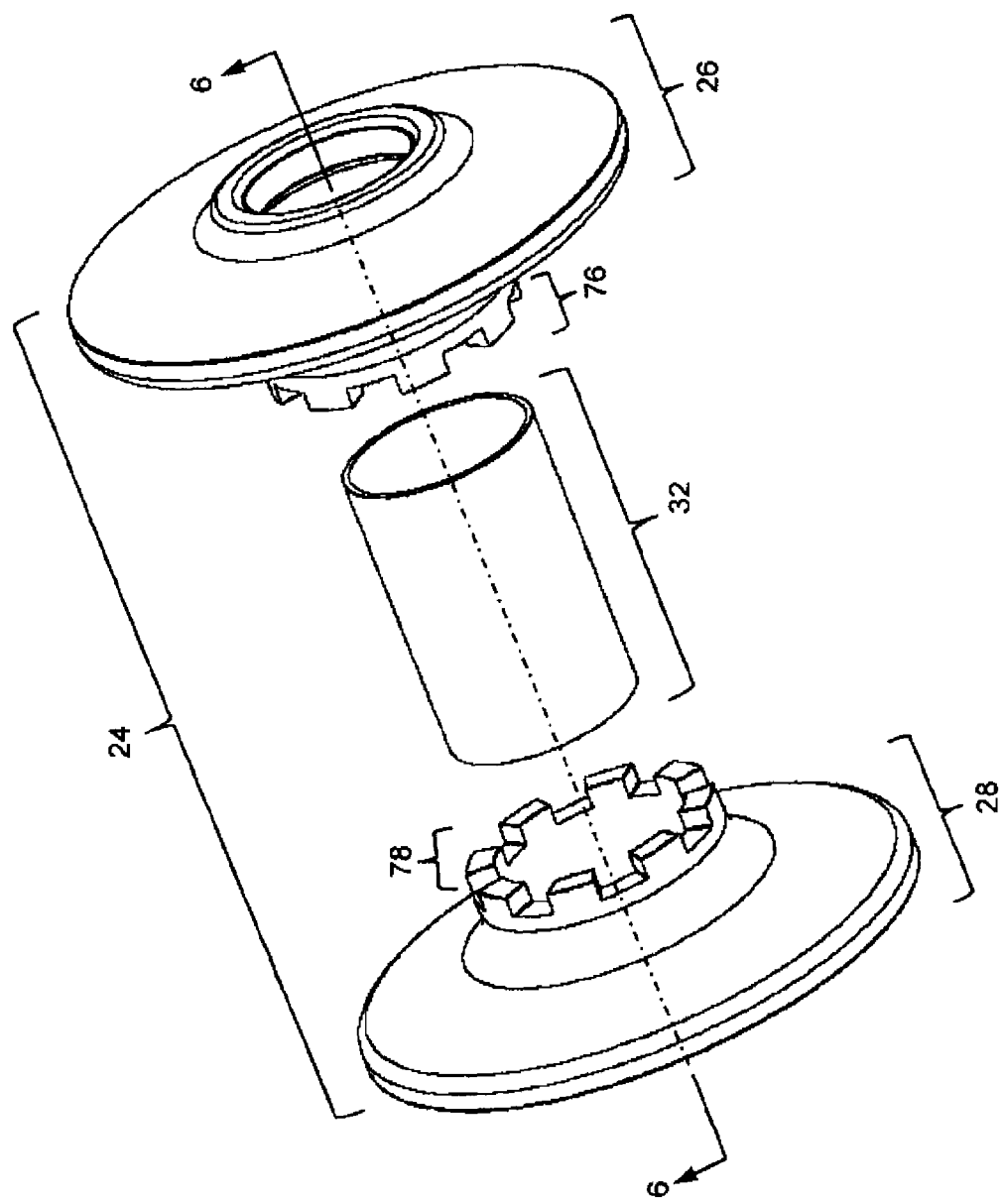
FIG. 5 is an exploded perspective view of the split idler disc assembly.

Referring now to FIG. 1, a perspective view of a continuously variable transmission 10 is shown. A portion of the housing 12 is cut such that the internals of the continuously variable transmission 10 may be illustrated. During operation of the continuously variable transmission 10, either a first set of rollers 14 or a second set of rollers 16 are pushed toward a main shaft 18 to vary the input to output drive ratio. To this end, as shown in FIG. 2, the first and second sets of rollers 14, 16 laterally shifts drive and driven discs 20, 22 as well as a split idler disc assembly 24 to accommodate the first and second sets of rollers. The shifts are shown in hidden lines in FIG. 2. As the first and second sets of rollers 14, 16 are pushed closer to the main shaft 18 or further away, the drive disc 20 and the driven disc 22 are spread or pushed apart due to the elasticity or spring rate of the main shaft 18. To compensate for this variation or deflection, the split idler disc assembly 24 comprises a first disc 26 and a second disc 28. These discs 26, 28 are gapped apart from each other (see FIG. 4). The gap is identified as reference numeral 30 in FIG. 4. The gap 30 allows the first and second discs to be deflected closer to each other when needed or when the drive and driven discs 20, 22 are pushed apart. To this end, the split idler disc assembly 24 further comprises a strain compensator 32 which is shown in FIGS. 2 and 5. The strain compensator 32 butts up against medial side surfaces 34, 36 of the first and second discs 26, 28, as shown in FIG. 6. The strain compensator 32 is compressible to allow deflection of the first and second discs 26, 28. In this manner, when the drive and driven discs 20, 22 are spread apart from each other, the strain compensator 32 compresses to deflect the first and second discs 26, 28 of the split idler disc assembly to maintain alignment and symmetrical loading of the various components of the continuously variable transmission 10.

The following is a more detailed description of the continuously variable transmission 10. The continuously variable transmission 10 may have an input flange 38, as shown in FIG. 1. The input flange 38 may be connected to a rotational input 40. The input flange 38 is fixedly secured to an input gear 42 which drives the first set of rollers 14. Referring now to FIG. 2, each roller 44 of the first set 14 is frictionally engaged to a skewed driving surface 46 of the drive disc 20 and a skewed driving surface 48 of the first disc 26 of the split idler disc assembly 24. The input flange 38 and the input gear 42 are rotationally mounted to the housing 12 by bearings 50. The input flange 38 may be secured to the input gear 42 through a nut and threaded shaft arrangement 52 and the spline arrangement 51. The nut and threaded shaft arrangement 52 axialy couples the parts 38, 42. The spline arrangement 51 rotationally couples the parts 38, 42. The drive disc 20 may be mounted to the main shaft 18 with a threaded fastener 54. The drive disc 20 is rotationally independent from the input gear 42. As such, the drive disc 20 may rotate at a different speed compared to the rotational speed of the input gear 42. As shown in FIG. 2, the main shaft 18 may have an axel 56 that rotates within a bushing formed in the input gear 42. The main shaft 18 may also laterally shift within the bushing of the input gear 42 as shown by the hidden lines in FIG. 2.

The input gear 42 rotates the first set of rollers 14. The first set of rollers 14 are frictionally engaged to the drive disc 20 and the first disc 26 of the split idler disc assembly 24 and rotates the drive disc 20 as well as the main shaft 18 about a rotational axis 58 of the main shaft 18. Rotation of the main shaft 18 rotates the driven disc 22 and also rotates the second set of rollers 16 through engagement of the skewed driven surface 60 of the driven disc 22 to the conical driving surface 62 of the rollers of the second set 16. Since the second disc 28 of the split idler disc assembly is fixed to the first disc 26, rotation of the first disc 26 also transmits power or rotational energy to the rollers of the second set 16 via engagement between the skewed driven surface 61 of the second disc 28 and the rollers of the second set 16.

The rollers of the second set 16 are engaged to the output gear 64 which is fixedly engaged to the output flange 66 via a threaded post and nut arrangement 52 and a spline arrangement 65. The post and nut arrangement 52 axialy couples the parts 66, 64. The spline arrangement 65 rotationally couples the parts 66, 64. The output flange 66 and the output gear 64 are rotational mounted to the housing 12 by bearings 50. The main shaft 18 may laterally shift within a bushing of the output gear 64 as shown by the hidden lines in FIG. 2.

The driven disc 22 is fixedly secured to the main shaft with the threaded fastener 54 and is also rotationally decoupled from the output gear 64. As a review, rotation is imparted on the input flange 38, to the input gear 42, to the first set of rollers 14, to the drive disc 20, to the split idler disc assembly 24, to the driven disc 22 through the main shaft, to the second set of rollers 16, and ultimately to the output gear 64 and the output flange 66. The continuously variable transmission 10 shown and described herein may also be reversible in that the input power may be received by the flange 66 and flange 38 may deliver the output.

Figure 3:
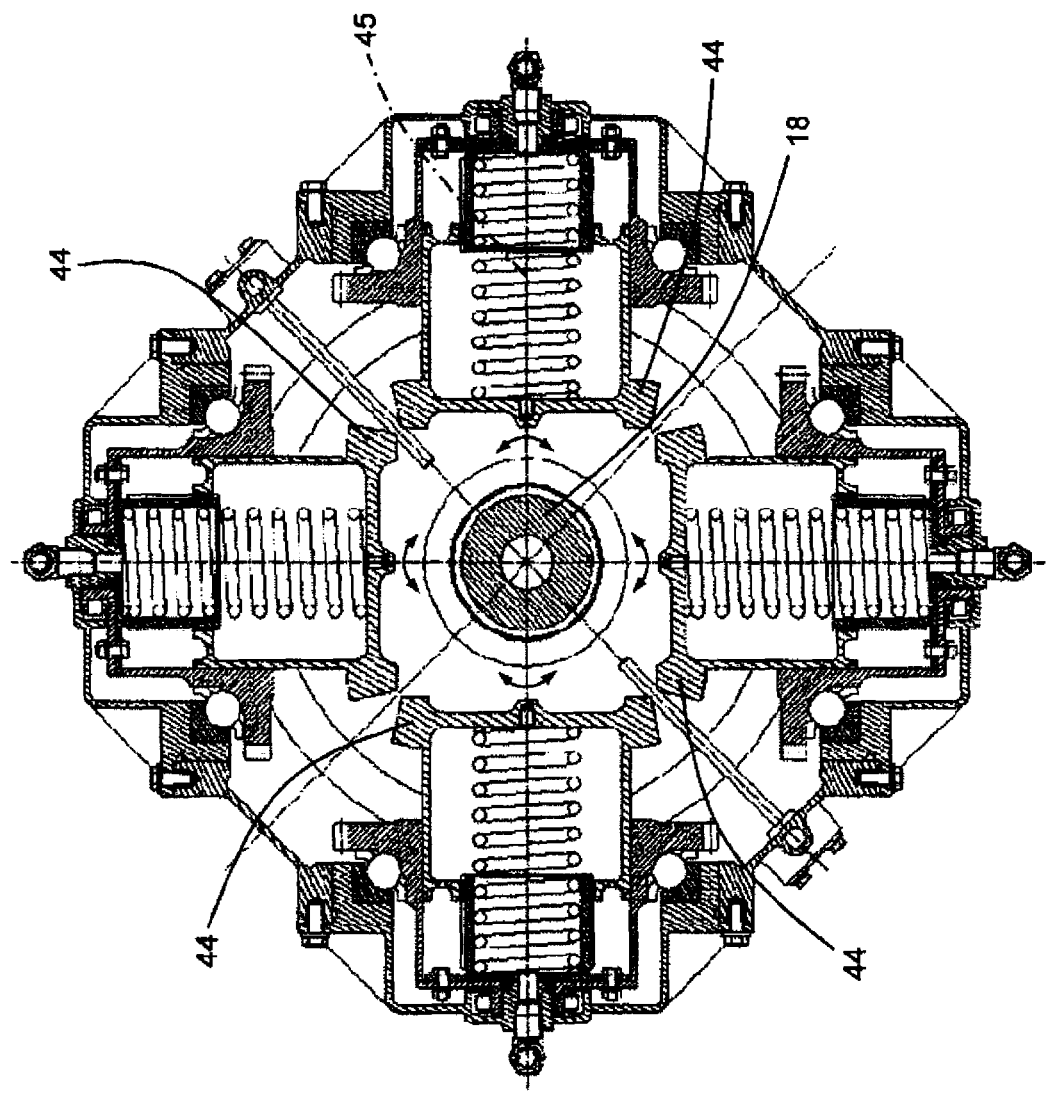
FIG. 3 is a cross sectional view of the continuously variable transmission shown in FIG. 2.

Referring now to FIG. 2, all rollers 44 of the first set 14 may be spaced away from the main shaft 18 to the same amount. This is shown in FIGS. 2 and 3. In this manner, the input gear 42 rotates the rollers 44 of the first set 14 at the same rotational speed. As shown in FIG. 3, there may be four rollers radially disposed about the main shaft 18. The symmetry of the roller 44 placement, the rotational speeds of the rollers 44 and the distance of the rollers 44 from the main shaft 18 promote symmetrical loading or force distribution between the rollers 44 of the first set 14 with the drive disc 20 and the first disc 26 of the split idler disc assembly 24. Preferably, the second set of rollers 16 exhibit the same level of symmetry to promote symmetrical loading and force distribution within the continuously variable transmission 10.

Referring now to FIG. 2, the rollers 44 of the first and second sets 14, 16 rotate about axis 45, 47 respectively. The axis 45 of rotation for the rollers 44 of the first set 14 are aligned within a singular plane as shown in FIG. 3. Similarly, the axes 47 of rotation of the rollers 44 of the second set 16 also are aligned within a single plane. The plane in which the axes 45 are aligned to is preferably parallel with the plane to which the axes 47 of the rollers of the second set are aligned. The alignment of the axes 45 to each other and the alignment of the axes 47 to each other also promotes symmetrical loading and force distribution.

The first set of rollers 14 may be hydraulically connected to a first hydraulic system. To traverse the rollers 44 of the first set 14 closer to the main shaft, the hydraulic lines 68 of the first set of rollers 14 may be increased in pressure. This forces the rollers 44 of the first set 14 closer to the main shaft 18 as shown by the hidden lines in FIG. 2. As the rollers 44 of the first set 14 are traversed closer to the main shaft 18, the drive disc 20 is pushed to the right along with the driven disc 22. (See hidden lines). The split idler disc 24 is pushed to the left. This movement causes the driven disc 22 and the second disc 28 of the split idler disc assembly 24 to push the rollers 44 of the second set 16 further away from the main shaft 18. Conversely, the hydraulic line 70 may be increased in pressure to traverse the rollers 44 of the second set 16 closer to the main shaft 18. This has the opposite effect of pushing the rollers 44 of the first set 14 further away from the main shaft 18. The driven disc 22 is shifted to the left along with the drive disc 20. The split idler disc assembly 24 is shifted to the right. The first disc 26 and the drive disc 20 push the rollers 44 of the first set 14 further away from the main shaft 18.

As the rollers 44 of the first set 14 and the second set 16 are pushed closer to or further away from the main shaft 18, a distance 72 (see FIG. 4) between the drive disc 20 and the driven disc 22 is increased. The increase is due to the elasticity of the main shaft 18. Although the main shaft 18 is fabricated from a metallic material such as steel, alloys of steel or the like, nonetheless steel has an axial spring rate which however minutely still does significantly affect the load distribution within the continuously variable transmission 10. If the change in distance 72 is not compensated, then the radial forces acting upon the rollers 44 may push one or more of the rollers 44 of the first set 14 or second 16 out of alignment such that the roller/disc contact location may not be optimal. To compensate for the changes in the distance 72 between the drive disc 20 and the driven disc 22, the split idler disc assembly 24 may compress to compensate for such changes in the distance 72. The split idler disc assembly 24 may comprise the first disc 26 and the second disc 28 which are gapped apart as shown by gap 30 in FIG. 4. When the distance 72 increases, a distance 74 between the first and second discs 26, 28 may decrease. Preferably, the amount of positive deflection in distance 72 may be compensated by a negative deflection in the distance 74. Preferably, the positive deflection in distance 72 is about equal to or equal to the amount of negative deflection in distance 74. The split idler disc assembly 24 compensates for the asymmetrical loading caused by an increased distance 72 between the drive disc 20 and the driven disc 22. The split idler disc assembly 24 is compressed to account for the increased distance 72 and brings the loading on the rollers and discs back to symmetry.

During operation of the continuously variable transmission 10, the distance 72 may increase or decrease as the rollers of the first set 14 or second set 16 are pushed toward the main shaft 18. The split idler disc assembly 24 compresses or expands based on the action of the distance 72. The split idler disc assembly 24 mitigates against asymmetrical loading on the rollers 44 of the first and second sets 14, 16 that may be caused by a change in distance 72 by compressing the split idler disc assembly 24. If the split idler disc assembly 24 did not compress then the discs 20, 22 may impose asymmetrical loading on the rollers 44 of the first and second sets 14, 16 such that the rollers 44 of the first set 14 may rotate about axes that are not within the same plane, and the rollers 44 of the second set 16 may rotate about axes that are not within the same. Moreover, the axes of the rotation of the first set of rollers 14 may not be parallel to the axes of the rotation of the second set of rollers 16.

Referring now to FIG. 5, an exploded view of the split idler disc assembly 24 is shown. The first and second discs 26, 28 of the split idler disc assembly 24 may be interlocked with each other. In particular, the first disc 26 may have a plurality of castellations 76. Likewise, the second disc 28 may have a corresponding matched set of castellations 78. The castellations 76 of the first disc 26 may be intermeshed with the castellations 78 of the second disc 28. This allows axial displacement between the first and second discs 26, 28 but locks the rotational movement between the first and second discs 26, 28 such that the discs 26, 28 rotate in unison about the rotational axis 58.

Referring now to FIG. 6, the strain compensator 32 may fit within both the first disc 26 and the second disc 28. In particular, the strain compensator may define opposed ends 80, 82. These opposed ends 80, 82 of the strain compensator 32 may butt up against the medial side surface 34 of the first disc 26 and the medial side surface 36 of the second disc 28, respectively. At this point, there is still a gap 30 between the first and second discs 26, 28 of the split idler disc assembly 24 as shown in FIG. 4. A length 84 of the strain compensator 32 may be sufficiently long to still provide for the gap 30. The internal diameter of the strain compensator 32 and the first and second discs 26, 28 may have a sliding fit on the main shaft 18. As shown in FIG. 2, when the split idler assembly 24 is mounted to the shaft 18, the split idler assembly 24 may slide longitudinally along the rotational axis 58.

In an aspect of the continuously variable transmission 10, the spring rate of the strain compensator 32 may correspond to the spring rate of the main shaft 18 such that the deflection in distance 74 compensates for the deflection in distance 72. To this end, the main shaft 18 and the strain compensator 32 may be modified to achieve the desired deflections. By way of example and not limitation, any one or more of the following modifications may be made to the shaft 18 and the strain compensator 32 to adjust and match the spring rates of the shaft 18 and the strain compensator 32. The shaft 18 may be hollowed out, as shown in FIG. 2. By hollowing out the main shaft 18, the spring rate of the main shaft 18 is reduced in that the spring rate of a hollowed shaft 18 is less than the spring rate of a solid main shaft 18. The outer diameter of the shaft 18 may be increased to increase the spring rate of the shaft. Likewise, the thickness of the strain compensator 32 wall may be increased or decreased such that the deflection of the strain compensator 32 matches the deflection of the main shaft 18 to an appropriate amount. By modifying the inner and outer diameters of the shaft 18 and the strain compensator 32, the spring rates of the shaft 18 and the strain compensator may be matched. Additionally, the length of the shaft 18 and the strain compensator 32 may be adjusted to match the spring rates of the shaft 18 and the strain compensator 32. Also, the types of materials used for the shaft 18 and the strain compensator may be varied to adjust and match the spring rates of the shaft 18 and the strain compensator 32. Preferably, the spring rate of the main shaft 18 is adjusted and matched to be about equal to the spring rate of the strain compensator 32 by modifying the strain compensator 32 and the shaft 18 in one or more of the ways discussed above.

In an aspect of the continuously variable transmission 10, each of the rollers 44 of the first and second sets 14, 16 may be spring loaded with a biasing member 86. The biasing member 86 may be a compression spring as shown in FIG. 2. The biasing member 86 provides a preload which assists the continuously variable transmission 10 during startup and shut down.

Referring now back to FIG. 3, four rollers 44 of the first set 14 are shown. The rollers 44 each frictionally engages the drive disc 20 and the first disc 26. The amount of power transmitted through the continuously variable transmission 10 may be increased by increasing the number of rollers 44 that make up the first set 14. The amount of power transmitted through the continuously variable transmission 10 is divided by the number of rollers 44 in the first set 14. Since there is a maximum amount of power that can be transmitted between one roller 44 of the first set 14 to the drive disc 20 and the first disc 26, increasing the number of rollers 44 in the first set 14 would also increase the amount of power that can be transmitted through the continuously variable transmission 10. The same is true for the rollers of the second set 16. Preferably, the number of rollers 44 in the second set 16 is equal to the number of rollers in the first set 14. Although the various aspects of the continuously variable transmission 10 may be practiced with a single roller 44 that makes up the first set 14 and a single roller 44 that makes up the second set 16, preferably, the first and second sets 14, 16 of rollers 44 has at least two rollers 44 in each set 14, 16. The two rollers are symmetrically placed on opposed sides of the main shaft 18 to provide symmetrical loading on the components of the continuously variable transmission 10. Additional rollers may be added to the first and second sets 14, 16. However, for each additional roller, the rollers 44 that make up the first and second sets 14, 16 may be disposed about the main shaft 18 in a symmetrical manner to maintain symmetrical loading on the components of the continuously variable transmission 10.

The above description is given by way of example, and not limitation. Given the above disclosure, one skilled in the art could devise variations that are within the scope and spirit of the invention disclosed herein, including various ways of mounting the main shaft to the housing. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A continuously variable transmission for producing a variable drive ratio between an input and an output, the transmission comprising:
   a shaft rotating about a rotating axis, the shaft defining an axial spring rate;
   an input disc fixed to the shaft having a skewed driving surface with respect to a plane orthogonal to the rotating axis of the shaft;
   an output disc fixed to the shaft having a skewed driven surface with respect to the plane orthogonal to the rotating axis of the shaft, the skewed driving surface of the input disc and the skewed driven surface of the output disc generally facing each other, the input and output discs are deflected as the drive ratio is varied;
   a split idler disc assembly for compensating deflection of the input and output discs as the drive ratio is varied, the split idler disc being slideable along the rotating axis and rotateable on the shaft about the rotating axis, the split idler disc assembly comprising:
      a first disc having a skewed driving surface with respect to the plane orthogonal to the rotating axis of the shaft, the skewed driving surface of the first disc generally facing the skewed driving surface of the input disc;
      a second disc having a skewed driven surface with respect to the plane orthogonal to the rotating axis of the shaft, the skewed driven surface of the second disc generally facing the skewed driven surface of the output disc, the first disc gapped away from the second disc to allow the first and second discs to be deflected as the drive ratio is varied; and
      a strain compensator being a tube and defining first and second opposed ends which abut medial sides of the first and second discs, the strain compensator defining an axial spring rate matched to the axial spring rate of the shaft so that the first and second discs are deflected an appropriate amount to compensate for the deflection of the input disc and output disc as the drive ratio is varied:
   an input roller connected to the input, the input roller having a conical driving surface drivingly engaged to the skewed driving surfaces of the input disc and the first disc;
   an output roller connected to the output, the output roller having a conical driving surface drivenly engaged to the skewed driven surfaces of the output disc and the second disc.

2. The transmission of claim 1 wherein the axial spring rate of the shaft and the axial spring rate of the strain compensator are matched to each other so that the deflection of the first and second discs of the split idler disc assembly is about equal to the deflection of the input and output discs.

3. The transmission of claim 1 wherein the axial spring rate of the shaft and the axial spring rate of the strain compensator are matched to each other to maintain symmetrical loading within the continuous variable transmission.

4. The transmission of claim 1 wherein the tube configuration of the strain compensator is continuously solid between the first and second opposed ends.

5. The transmission of claim 1 wherein the first and second discs having interlocking straight teeth to maintain rotational lock yet allow movement closer to or further apart from each other in a direction of the rotational axis of the shaft.

6. The transmission of claim 1 further comprising an input roller biasing member connected to the input roller for biasing the input roller against the skewed driving surfaces of the input disc and the first disc and an output roller biasing member connected to the output roller for biasing the output roller against the skewed driven surfaces of the output disc and the second disc.

7. The transmission of claim 6 wherein the input and output roller biasing members are a helical compression spring.

8. The transmission of claim 1 wherein the main shaft is hollow to match the axial spring rate of the main shaft to the axial spring rate of the strain compensator.

9. The transmission of claim 1 wherein the tube of the strain compensator has a solid continuous sidewall.

10. A continuously variable transmission for producing a variable drive ratio between an input and an output, the transmission comprising:

a shaft rotating about a rotating axis, the shaft defining an axial spring rate;

an input disc fixed to the shaft having a skewed driving surface;

an output disc fixed to the shaft having a skewed driven surface which faces the skewed driving surface of the input disc, a distance between the input and output discs changes as the drive ratio is varied:

a split idler disc assembly for compensating for the change in distance between the input and output discs as the drive ratio is varied, the split idler disc being slideable along the rotating axis and rotateable on the shaft about the rotating axis, the split idler disc assembly comprising:

a first disc having a skewed driving surface which faces the skewed driving surface of the input disc;

a second disc having a skewed driven surface which faces the skewed driven surface of the output disc, the first disc gapped away from the second disc to allow for a change in distance between the first and second discs as the drive ratio is varied; and a deflection compensator disposed between the first and second discs, the deflection compensator defining an axial spring rate which is about equal to the axial spring rate of the shaft so that a distance between the first and second discs changes to compensate for a change in distance between the input and output discs as the drive ratio is varied:

an input roller connected to the input, the input roller having a conical driving surface drivingly engaged to the skewed driving surfaces of the input disc and the first disc; and an output roller connected to the output, the output roller having a conical driving surface drivenly engaged to the skewed driven surfaces of the output disc and the second disc.

11. The transmission of claim 10 wherein the first and second discs having interlocking straight teeth to rotationally lock the first and second discs to each other and allow relative axial movement to compensate for deflection between the outer discs.

12. The transmission of claim 10 wherein the shaft is hollow.

13. A continuously variable transmission for producing a variable drive ratio between an input and an output, the transmission comprising:

a shaft rotating about a rotating axis, the shaft defining an axial spring rate, the shaft being hollow for decreasing an axial spring rate of the shaft:

an input disc fixed to the shaft having a skewed driving surface:

an output disc fixed to the shaft having a skewed driven surface which faces the skewed driving surface of the input disc, a distance between the input and output discs changes as the drive ratio is varied;

a split idler disc assembly for compensating for the change in distance between the input and output discs as the drive ratio is varied, the split idler disc being slideable along the rotating axis and rotateable on the shaft about the rotating axis, the split idler disc assembly comprising:

a first disc having a skewed driving surface which faces the skewed driving surface of the input disc:

a second disc having a skewed driven surface which faces the skewed driven surface of the output disc, the first disc gapped away from the second disc to allow for a change in distance between the first and second discs as the drive ratio is varied; and a deflection compensator disposed between the first and second discs, the deflection compensator defining an axial spring rate matched to the spring rate of the shaft so that the distance between the first and second discs changes to compensate for the change in distance between the input and output discs as the drive ratio is varied;

an input roller connected to the input, the input roller having a conical driving surface drivingly engaged to the skewed driving surfaces of the input disc and the first disc; and an output roller connected to the output, the output roller having a conical driving surface drivenly engaged to the skewed driven surfaces of the output disc and the second disc.

* * * * *